C. R. DAIGH.
GRAIN SAVING DEVICE FOR THRESHING MACHINES.
APPLICATION FILED OCT. 27, 1915.
1,181,373.
Patented May 2, 1916.
3 SHEETS—SHEET 1.
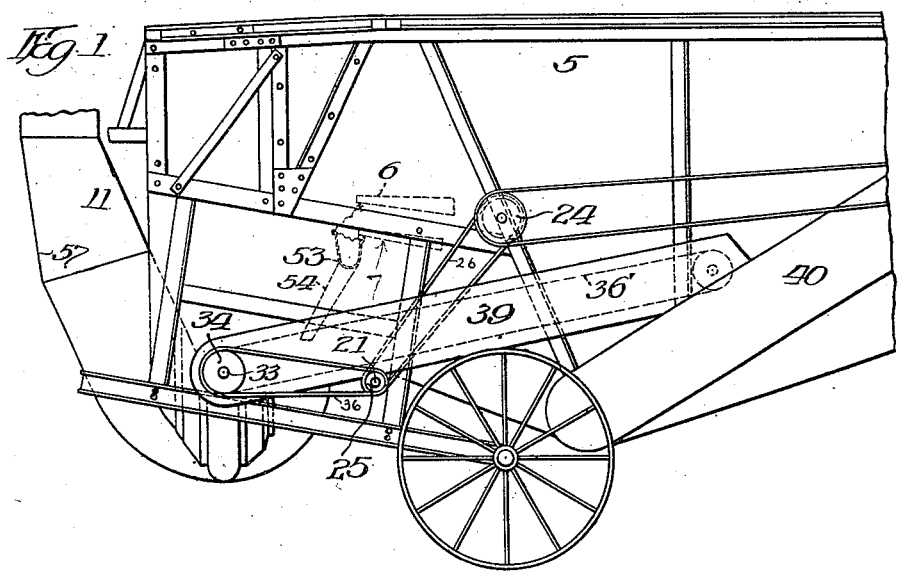
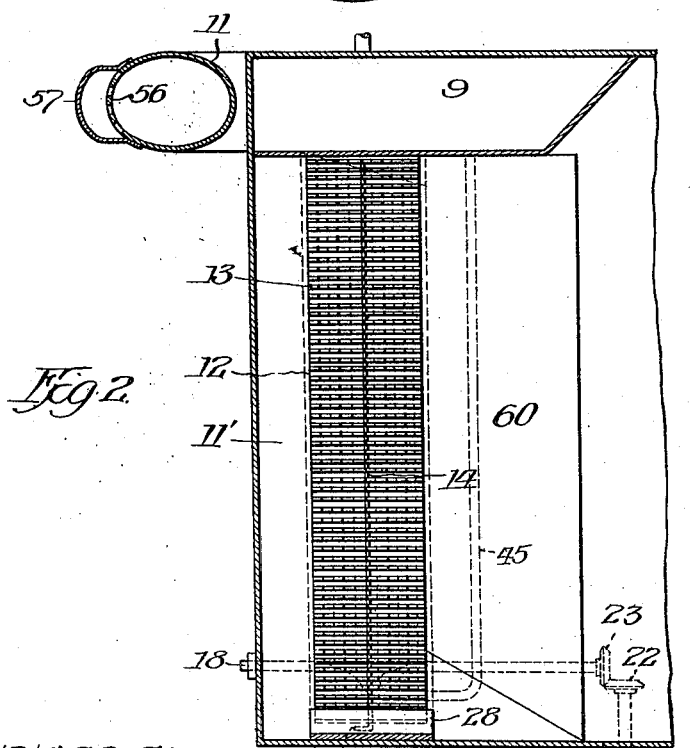
Witnesses:
Inventor
Charles R. Daigh
By James A. Walsh
Atty.

C. R. DAIGH.
GRAIN SAVING DEVICE FOR THRESHING MACHINES.
APPLICATION FILED OCT. 27, 1915.
1,181,373.
Patented May 2, 1916.
3 SHEETS—SHEET 2.
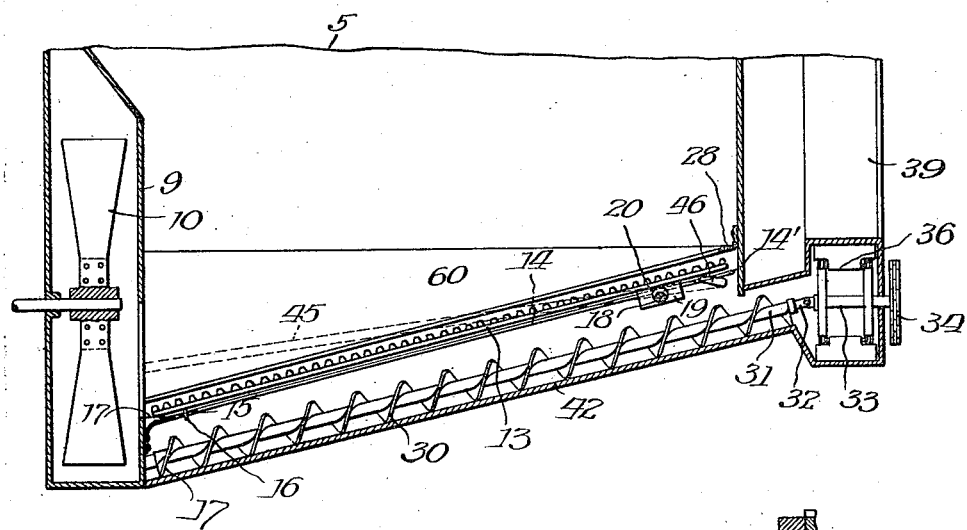
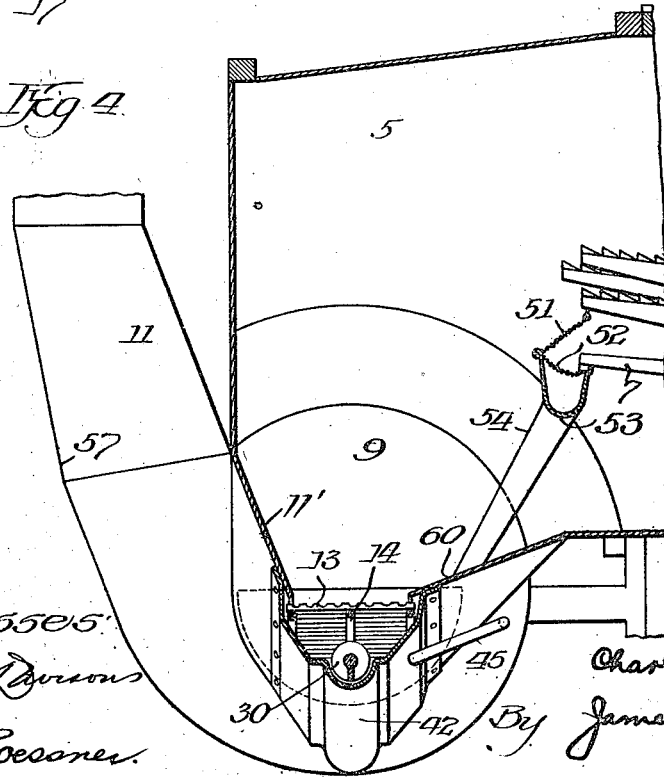
Witnesses
Geo C Davison
C. H. Roesner
Inventor
Charles R. Daigh
By James A Walsh
Atty

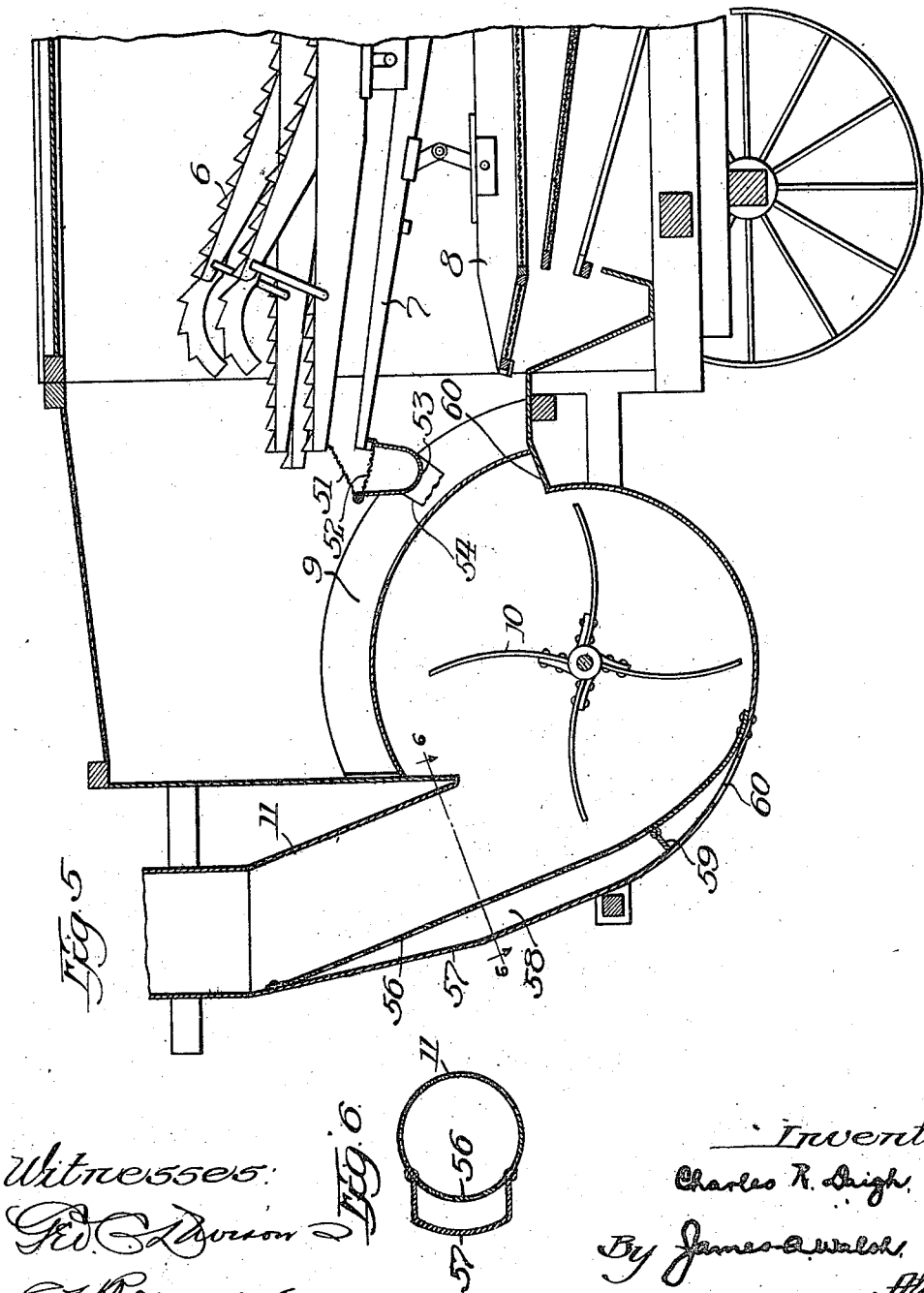

UNITED STATES PATENT OFFICE.

CHARLES R. DAIGH, OF PARSONS, KANSAS, ASSIGNOR OF ONE-HALF TO HOMER H. POOLE, OF PARSONS, KANSAS.

GRAIN-SAVING DEVICE FOR THRESHING-MACHINES.

1,181,373. Specification of Letters Patent. Patented May 2, 1916.

Application filed October 27, 1915. Serial No. 58,274.

*To all whom it may concern:*

Be it known that I, CHARLES R. DAIGH, a citizen of the United States, residing at Parsons, in the county of Labette and State of Kansas, have invented certain new and useful Improvements in Grain-Saving Devices for Threshing-Machines, of which the following is a specification.

My present invention relates to improvements in threshing machines, and particularly to mechanisms applied thereto for the purpose of trapping and saving that grain which has not been separated and collected by the straw separating mechanisms in the machine, such grain being mingled with the straw and chaff and discharged from the straw racks and winnowing devices into the hopper of the stacker from which it is withdrawn by the stacker fan and discharged onto the straw stack to become wasted; and it is my object to capture such grain and return the same into the separator or elsewhere, to be recleaned and saved.

In the accompanying drawing forming part hereof, Figure 1 is a side elevation of a portion of a threshing machine embodying my improvements; Fig. 2 a plan looking into the straw stacker hopper; Fig. 3 a transverse sectional view of said hopper; Fig. 4 a sectional view through the stacker structure looking in the direction of the fan; Fig. 5 a longitudinal sectional view through the stacker drum, and Fig. 6 is a detail sectional view taken on the dotted line 6—6 of Fig. 5.

In said drawings the portions marked 5 indicate the threshing machine casing, 6, the straw racks of any suitable construction and arrangement, 7, a return grain pan, 8, the chaffer, 9, the stacker fan drum, 10, the fan therein, and 11 the stacker boot. In the hopper, 11', of the stacker I mount a sieve, 12, of an ordinary and well known character and commonly used in threshing machines, the slats, 13, of which are adjustable by the rod, 14, having a hand-hold, 14', so that the spaces therebetween can be made larger or smaller for handling different sizes of grain and seeds. The lower end of said screen may be slidably mounted adjacent the fan drum by means of the rods, 15, and eyes, 16, a set of such devices being arranged at opposite sides of the sieve, or said sieve may be mounted in any appropriate manner to permit its vibration, the edge thereof preferably overlapping the ledge, 17, at the side of the fan drum 9. As shown, said sieve is upwardly inclined toward the opposite frame structure of the stacker and terminates sufficiently distant therefrom to permit its vibration by the shaft, 18, which is mounted in a suitable bearing, 19, and upon which at opposite sides of the screen are eccentrics, 20, which impart vibration to said sieve, the shaft 18 being driven from any convenient source, that shown being shaft 21, Fig. 2, communicating with said shaft 18, by the gearing, 22, 23, and which shaft 21 is driven by any appropriate source of power from the threshing machine, an example of which (Fig. 1) being the pulley, 24, which communicates with pulley, 25, on shaft 21, by belt, 26. The upper end of said sieve is overlapped by a hinged plate, 28, which may be folded back for access to the hand-hold 14', to adjust sieve 12 as may be desired, and said plate 28 also serves to prevent straw and the like from entering the space between the upper end of said sieve and the wall or frame of the stacker structure, and being fixedly mounted follows the movement of said sieve in its vibrations, as will be understood. Beneath said sieve I place an auger, 30, which at its lower end is mounted in fan drum 9 in any suitable manner, and which auger inclines upwardly to the opposite side of the stacker frame, the shaft, 31, thereof being connected by a universal joint, 32, to a horizontal shaft, 33, upon which is mounted a suitable sprocket or pulley, 34, which connects with a pulley on shaft 21 by a chain or belt 36, said devices being provided for driving a conveyer belt, 36', of any appropriate form which is inclosed in casing, 39, said conveyer belt and casing constituting a conveyer leading to and discharging into the ordinary tailings conveyer, 40, usually forming part of a threshing machine, said auger 30 being inclosed in a casing, 42, for retaining material, which is agitated through the sieve 12. I may also employ a blast in connection with said vibratory screen 12 for winnowing material falling onto the sieve and accelerating the movement of the chaff, short straws, etc., composing the same, into the stacker fan to be ejected onto the straw stack, and this can be obtained from any suitable source, that shown being the pipe, 45, attached to the drum in a usual and well known manner, and leading to the upper end of the sieve, where it terminates in a nozzle, 46, which distributes the blast of air across said sieve into the fan, thus carrying light material into the influence of the stacker fan by which it is withdrawn and discharged, or such blast may be produced by a separate fan for the purpose, or from the cleaning fan or other suitable source in a threshing machine. At the end of said straw rack 6 I provide a screen which is preferably of the form shown in Figs. 4 and 5, having the portion, 51, inclining rearwardly from said rack, and a further portion, 52, connected to the grain pan, 7, a trough, 53, being supported by said grain pan directly under said screen, said trough communicating with the chute, 54, which may be led to the sieve 12 for discharging grain thereinto, or to any other convenient or desired receptacle, for a purpose which will hereinafter appear. The boot 11 leading from the stacker fan is provided with an inner perforated rear wall, 56, and an outer imperforate wall, 57, through which perforations grain threshed from heads by the stacker fan will pass into the chamber, 58, and by gravity descend to a yielding or flap door, 59, by which it is retained therein until released, when it passes through the opening, 60, to any suitable receptacle or conveyer (not shown).

In operation, the masses of straw falling from the vibrating straw racks 6, strike the screen 51, 52, and a portion of the loose grains therein sift through the screen into trough 53, from whence it is conveyed by chute 54 onto sieve 12 or otherwise, as may be preferred. Simultaneously with the falling straw masses, chaff, dust, etc., are discharged from the winnowing devices beneath, all of which material enters the stacker hopper 11′ and travels across the sieve 12 therein downwardly into the stacker fan. This sieve being vibratable, accelerates the movement of the material toward the fan, at the same time agitating it so that loose grains shaken therefrom fall through the sieve into the casing 42 and are conveyed therefrom by the auger 30 into the conveyer 39, by which it is carried into conveyer 40, to be returned to the threshing machine for recleaning, and by employing a blast as indicated the material falling onto the screen is both winnowed and the lighter portions thereof driven toward the stacker fan. In the operation of straw stacking the ordinary stacker hopper is not at all times capable of directing the straw and other material into the influence of the suction created by the stacker fan to be withdrawn thereby, and this is particularly so at the side of the stacker farthest from the fan where no suction is created. By providing a vibratable screen substantially as indicated and adapted to operate reciprocally in its length in relation to the stacker fan, straw lodging at the point stated becomes dislodged by the throw of the sieve so that it is kept moving downwardly toward the fan, which prevents choking of the stacker, and at the same time eliminates the service of an attendant, which it has been found has been necessary for poking or urging the straw toward the fan when in wet or rotten condition, as otherwise it accumulates in the hopper to such an extent as to clog the stacker, requiring the cessation of operation until the stacker has been cleaned out. While I have shown a single sieve for the purpose, it will be understood, of course, that I may employ two sieves, one above the other, to be used together or interchangeably for grading purposes, according to the character of grain or seed to be saved.

It is well known that a considerable portion of unthreshed heads of grain are carried into the stacker fan and threshed by the fan blades, to be discharged with the straw and wasted. In order to save this grain I provide the perforated boot as described, so that as grains fly from the fan blades they will pass through said perforations and accumulate in the chamber 58, being held by the yielding door 59 until the weight of the grain is sufficient to open the same, when it passes on through the opening 60 to be saved. It will be understood also that more or less air passes through said perforations, but by providing a door or valve, as 59, the downward flow of air is diverted, so that it will constantly return upwardly through said perforations and discharge through the stacker chute as usual.

I claim as my invention:

1. In a combined grain saving device and straw carrier for threshing machines, a material receiving receptacle, a fan communicating therewith, a conveying and separating sieve positioned in said receptacle and operable reciprocally in the direction of its length to carry straw directly into the eye of said fan and to separate grain from such straw before the latter enters said fan, means for reciprocating said sieve longitudinally for agitating the material passing thereover, and means for conveying away the grain separated by said sieve.

2. In a combined grain saving device and straw carrier for threshing machines, a material receiving receptacle, a fan communicating therewith, a longitudinally reciprocating conveying and separating sieve in said receptacle for agitating the straw and separating the grain therefrom and carrying such straw directly to the eye of said fan, a casing beneath said sieve, a spiral conveyer in said casing, and means for actuating said conveyer to convey said separated grain from said sieve.

3. In a combined grain saving device and straw carrier for threshing machines, a material receiving receptacle, a fan communicating therewith, a longitudinally reciprocating adjustable conveying and separating sieve in said receptacle for agitating straw and separating grain therefrom and carrying such straw directly to the eye of said fan, means for adjusting said sieve to accommodate different sizes of grain, and means for actuating said sieve to propel straw toward said fan and to trap grain dislodged therefrom in its passage across said sieve.

4. In a combined grain saving device and straw carrier for threshing machines, a material receiving receptacle, a fan communicating therewith, longitudinally reciprocating shaking means in said receptacle for agitating straw and separating grain therefrom and directing such straw to the eye of said fan, means for actuating the same, and means associated with said shaking means for producing an air blast across the same for winnowing grain from such straw and propelling the latter toward the eye of said fan.

5. In a combined grain saving device and straw carrier for threshing machines, a material receiving receptacle, a fan communicating therewith, a longitudinally reciprocating sieve in said receptacle for agitating straw and separating grain therefrom and directing such straw to the eye of said fan, means for actuating said sieve, means for adjusting said sieve to accommodate different sizes of grain, and removable means overlapping a portion of said sieve to permit access to said adjusting means.

6. In a combined grain saving device and straw carrier for threshing machines, a material receiving hopper, a fan communicating therewith, a longitudinally reciprocating conveying and separating sieve in said receptacle for agitating straw and separating grain therefrom and carrying such straw directly into the eye of said fan, eccentric means for longitudinally reciprocating said sieve, a conveyer beneath said sieve for conveying the grain separated thereby, and means communicating with said conveyer for receiving and conducting material therefrom.

7. In a grain saving and straw carrying device for threshing machines, a material receiving hopper, a fan communicating therewith, conveying and separating means movable longitudinally toward the eye of said fan and positioned in said receptacle in inclined relation to said fan for propelling straw directly thereinto and separating grain from said straw, and means positioned therebeneath for conveying such separated grain therefrom.

8. In a grain saving and straw carrying device for threshing machines, the combination of a main separator adapted to deliver a mixture of material such as straw, chaff and unseparated grain to the rear thereof, a material receiving and conveying receptacle into which said material is discharged, means in said receptacle for agitating such material and separating grain therefrom and directing such material into the eye of said fan, and means for accelerating the movement of said material across said sieve toward said fan and winnowing grain therefrom.

9. In a grain saving and straw carrying device for threshing machines, a material receiving hopper, a fan communicating therewith, longitudinally movable means in said receptacle for separating grain from other material and propelling such material into the eye of said fan, and a boot communicating with said fan through which material from such receptacle is discharged said boot having means therein for trapping unthreshed grain discharged from said receptacle into said fan.

In testimony whereof I affix my signature in presence of two witnesses.

CHARLES R. DAIGH.

Witnesses:
J. F. STEELE,
H. A. BRYANT.

Copies of this patent may be obtained for five cents each, by addressing the "Commissioner of Patents, Washington, D. C."